United States Patent
Pompei et al.

(10) Patent No.: US 6,319,206 B1
(45) Date of Patent: Nov. 20, 2001

(54) TEMPORAL THERMOMETER DISPOSABLE CAP

(75) Inventors: Francesco Pompei; Marybeth A. Pompei, both of Boston, MA (US)

(73) Assignee: Exergen Corporation, Watertown, MA (US)

( * ) Notice: Subject to any disclaimer, the term of this patent is extended or adjusted under 35 U.S.C. 154(b) by 0 days.

(21) Appl. No.: 09/448,909

(22) Filed: Nov. 24, 1999

(51) Int. Cl.[7] .................................................. A61B 5/00
(52) U.S. Cl. ............................................................. 600/549
(58) Field of Search ........................... 600/549, 200; 374/158

(56) References Cited

U.S. PATENT DOCUMENTS

| | | | |
|---|---|---|---|
| 2,797,684 | 7/1957 | Moore | 128/9 |
| 3,878,836 | 4/1975 | Twentier | 128/9 |
| 3,949,740 | 4/1976 | Twentier | 128/9 |
| 4,054,057 | 10/1977 | Kluge | 73/343 |
| 4,662,360 | 5/1987 | O'Hara et al. | 128/9 |
| 4,854,730 * | 8/1989 | Fraden | 600/549 |
| 4,911,559 | 3/1990 | Meyst et al. | 374/158 |
| 4,993,419 | 2/1991 | Pompei et al. | 128/664 |
| 5,017,019 * | 5/1991 | Pompei | 600/549 |
| 5,024,533 | 6/1991 | Egawa et al. | 374/126 |
| 5,088,834 * | 2/1992 | Howe et al. | 600/549 |
| 5,159,936 | 11/1992 | Yelderman et al. | 128/736 |
| 5,232,284 | 8/1993 | Egawa et al. | 374/126 |
| 5,340,215 | 8/1994 | Makita et al. | 374/121 |
| 5,487,607 | 1/1996 | Makita et al. | 374/158 |
| 5,626,139 | 5/1997 | Szeles et al. | 128/664 |
| 5,719,936 | 2/1998 | O'Hara et al. | 128/9 |
| 5,833,367 * | 11/1998 | Cheslock et al. | 374/158 |
| 5,874,736 | 2/1999 | Pompei | 250/338.1 |
| 5,893,833 | 4/1999 | Pompei et al. | 600/549 |
| 6,022,140 | 2/2000 | Fraden et al. | 374/158 |
| 6,139,182 * | 10/2000 | Levatter et al. | 374/158 |

FOREIGN PATENT DOCUMENTS

| | | |
|---|---|---|
| 0201790 | 11/1986 | (EP). |
| 0 411 121 A1 | 12/1988 | (EP). |
| 2012234 | 5/1994 | (RU). |
| WO 97/29350 | 8/1997 | (WO). |
| WO 97/42475 | 11/1997 | (WO). |

OTHER PUBLICATIONS

Pierce, W.V., "Results," Published by X–Cellent X–Ray Company (Revised Edition), Copyright 1986, Consisting of 5 pages.

Kagan J et al: "Asymmetry of Forehead Temperature and Cardiac Activity" Neuropsychology, US, Philadelphia, PA, vol. 9, No. 1, 1995, pp. 47–51.

* cited by examiner

Primary Examiner—Eric F. Winakur
Assistant Examiner—Brian Segal
(74) Attorney, Agent, or Firm—Hamilton, Brook, Smith & Reynolds, P.C.

(57) ABSTRACT

A disposable cap for a body temperature detector includes a body having a viewing end and a retaining end. The retaining end includes an inward protrusion that expands over a wider portion of an end of the detector and contracts after the retaining end has passed over the wider portion to snugly secure the cap on the detector. The cap further includes a flange with an aperture therethrough adjacent the viewing end to permit a radiation sensor of the detector to view a target surface. Preferably, the cap is sufficiently large so as to not be insertable into an ear of a human. The cap is formed from a sheet of material, preferably by thermoforming, from a material such as polypropylene, polyethylene, polystyrene, or other similar material which has relatively low hardness and low thermal conductivity properties. The cap has a generally uniform thickness of about 0.020 inch.

21 Claims, 5 Drawing Sheets

TEMPORAL THERMOMETER DISPOSABLE CAP

BACKGROUND OF THE INVENTION

In recent years, infrared thermometers have come into wide use for detection of temperature of adults. For core temperature readings, infrared thermometers which are adapted to be inserted into the patient's ear have been very successful. Early infrared thermometers were adapted to extend into the ear canal in order to view the tympanic membrane and provide an uncorrected, direct reading of tympanic temperature which correlates with pulmonary artery temperature. More recently, however, to provide for greater comfort and ease of use, ear thermometers have been designed to provide corrected readings of the generally cooler distal ear canal. Such thermometers measure temperature of distal ear canal tissue and calculate arterial core temperature via heat balance.

It has been previously proposed to provide a sanitary cover or sheath for the probe which is inserted into the ear canal to minimize contamination and spreading of bacteria and viruses between patients. One such disposable speculum is disclosed in U.S. Pat. No. 4,662,360 to O'Hara et al., the contents of which are incorporated herein by reference.

U.S. Pat. No. 4,993,419 to Pompei et al., the contents of which are also incorporated herein by reference, provides an improved sanitary cover in the form of a removable plastic sheet which is stretched over the end of the probe. The sheet is retained on the probe by posts on the sides of the probe over which holes in the sheet are positioned.

To avoid clinical difficulties in using ear thermometers, particularly with neonates, axillary (underarm) infrared thermometers have been introduced. Infrared thermometers designed for axillary temperature measurements are presented in U.S. patent application Ser. Nos. 08/469,484, 08/881,891, and U.S. Pat. No. 5,874,736 to Pompei, the entire teachings of which are incorporated herein by reference. In each of those devices, an infrared detector probe extends from a temperature display housing and may easily slide into the axilla to lightly touch the apex of the axilla and provide an accurate infrared temperature reading in as little as one-half second. The axillary thermometer also relies on the arterial heat balance approach to provide arterial, oral or rectal temperature.

The axillary infrared thermometer has found great utility not only with neonates but as a screening tool in general, and especially for small children where conventional temperature measurements such as a thermometer under the tongue or a rectal thermometer are difficult. These systems also provide disposable sanitary covers for the clinical market which include plastic sheets similar to those disclosed in the '419 Pompei patent. When these thermometers are adapted for household use, concerns for patient cross-contamination associated with clinical temperature detectors are not so significant and therefore disposable covers have not always been employed.

However, for purposes of accuracy of measurement, a thin transparent film is provided over the viewing area of the infrared sensor. Without the film, any evaporation from the moist axillary region results in a temperature reduction at the target surface thereby reducing accuracy in the temperature reading. The film is pressed against the target surface, thus trapping the moisture and preventing evaporation. The thin film quickly equilibrates to the temperature of the target surface for an accurate reading.

SUMMARY OF THE INVENTION

The present invention provides for particularly convenient temperature readings of neonate, child and adult temperatures by detecting the temperature of the forehead directly over the superficial temporal artery.

Because arteries receive blood directly from the heart, they are a good choice for detecting core temperature, but an artery at the extremities of the body, such as those felt as pulse points at the wrist or ankle, are highly subject to vasoconstriction. This means, for example, that when an individual is extremely sick, in shock, or even just cold or nervous, the arteries constrict to reduce the flow of blood to that area as a means of retaining heat, or as in the case of shock, in an effort to redirect the blood to more critical areas of the body. This can result in a large temperature change at the artery which is a local artifact only and not representative of core temperature.

Ruling out those arteries located in the extremities, in attempting to replicate the temperature at the source (the heart), we find, in the temporal artery, an artery as short a distance from the heart as possible, with a high and relatively constant blood flow, and that is readily accessible on all individuals. The heart, the lungs and the brain are vital to our very existence, so the supply of blood is high to these organs and continues as high as possible even through, in the face of grave illness, other areas may shut down to accommodate.

Originating in the heart is the aorta, the main trunk of the arterial system. A direct extension of the aorta is the common carotid artery, a robust artery which runs upward in the neck and divides into the internal and external carotids. But the carotids, even the external carotid, are at best partially embedded, and at worst completely embedded in the skull, and therefore are not accessible at the skin. Extending directly from the carotid is the temporal artery, again an artery dividing internally and externally. We look to the external branch which travels in front of the ear and up into the soft temple area, terminating in a fork directly between the skin and the skull adjoining the eyebrow.

Demonstrably, the temporal artery is very easily accessible; in fact in most individuals, it is usually quite visible. Terminating in a two-prong fork, it easily doubles the assurance of measuring the correct area. Touching it does not present a risk of injury. There are no mucous membranes present, thus eliminating the risk of contaminates such as those found in the mouth and rectum. And, despite lying so close to the skin surface, the temporal artery perfusion, which is the flow of blood per unit volume of tissue, remains relatively constant and so ensures the stability of blood flow required for our measurement.

A temporal artery detector that employs a temperature sensor that is scanned across the forehead is disclosed in U.S. patent application Ser. No. 09/151,482, the contents of which are incorporated herein by reference. Although the cross-contamination problem is still obviated through use of disposable plastic sheets positioned over the sensor, it has been found that the condensation problem associated with moisture from the skin, as described in the '419 Pompei patent, is outweighed by inherent problems associated with the transparent film used to prevent the moisture from condensing adjacent the temperature sensor. This is attributable to at least two factors. First, the forehead region is less prone to moisture perfusion and thus the associated problems are less prevalent. Second, because the detector is dynamically scanned across the forehead, the transparent film may lift from the skin surface which induces inaccuracies in the resulting temperature reading. It is has been found that discarding this film increases the accuracy of the temperature readings.

In accordance with the present invention, a disposable cap for a body temperature detector includes a body having a viewing end and a retaining end. The retaining end includes an inward protrusion that expands over a wider portion of an end of the detector and contracts after the retaining end has passed over the wider portion to snugly secure the cap on the detector. The cap further includes a flange with an aperture therethrough adjacent the viewing end to permit a radiation sensor of the detector to view a target surface. Preferably, the cap is sufficiently large so as to not be insertable into an ear of a human.

The cap is formed from a sheet of material, preferably by thermoforming, from a material such as polypropylene, polyethylene, polystyrene, or other similar material which has relatively low hardness and low thermal conductivity properties. In one embodiment, the cap is formed from a material having a Rockwell hardness in the range of about 20 to 140 Shore D units and a thermal conductivity up to about $20.0 \times 10^{-4}$ cal./sec./sq.cm.,/1(° C./cm.). In another embodiment, the cap is formed from a material having a Rockwell hardness in the range of about 40 to 70 Shore D units and a thermal conductivity up to about $3.0 \times 10^{-4}$ cal./sec./sq.cm.,/1(° C./cm.). The cap preferably has a generally uniform material thickness of about 0.020 inch.

According to one aspect of the invention, the inward protrusion includes at least one dimple. Preferably, a plurality of dimples are formed at select points around the circumference to facilitate expansion thereof. The dimples also serve as cleats to provide additional retention force such that the cap snugly fits on the sensor assembly. In a preferred embodiment, the cap snap-fits onto a sensor assembly of the detector.

According to another aspect of the invention, the cap further includes an outwardly protruding annular lip to allow an operator to remove the cap from the detector. Preferably, the lip is adjacent the retaining end.

According to a further aspects, the flange includes an inside surface and an outside surface and a radius of curvature adjacent the viewing end such that an outer periphery of the inside surface of the flange contacts the terminal end of the detector to provide an air gap between the terminal end of the detector and the flange. The air gap insulates the end of the detector from the target surface to minimize inaccurate temperature readings. The air gap also serves as a cushion to reduce any uncomfortableness associated with pressing the detector too hard against the target surface.

According to other aspects of the present invention, a body temperature detector includes a temperature detector including a radiation sensor which views a target surface of the body. The detector further includes an end which is positioned adjacent the body during temperature detection. A disposable cap covers substantially all of the end of the detector likely to contact the body to prevent cross-contamination between persons. The cap includes a flange with an aperture therethrough to permit the radiation sensor of the detector to view a target surface of the body. The flange extends radially a distance substantially greater than its thickness and is spaced from the terminal end of the detector to provide an air gap between the terminal end of the detector and the flange. Preferably, the flange aperture has a diameter of between about 0.375 and 1 inches, and more preferably, about 0.5 inch.

Preferably, the flange has at least about 0.2 square inches of surface area which contacts the body during temperature detection. More preferably, the flange has at least about 0.4 square inches of surface area which contacts the body during temperature detection.

The length of the cap can vary in different embodiments. The cap should prevent contact by the hair and ear of the person whose temperature is being detected. In one embodiment, the length of the cap is at least about 0.375 inch, for use with infant temperature detection. In another embodiment, the length of the cap is at least about 0.75 inch, for use with adult temperature detection.

A method of detecting human body temperature is provided which includes the steps of providing a temperature detector which includes a metal end, such as stainless steel or other suitable material, which is positioned adjacent the body during temperature detection. Substantially all of the end of the detector likely to contact the body is covered with a disposable cap. The end of the detector is moved across the skin of the body to detect the body temperature, the detector being moved at the rate of about 1 inch/second, wherein the cap cools the surface of the skin by less than about 0.2° Fahrenheit. This helps insure a reliable temperature reading.

A method of detecting human body temperature includes the steps of scanning a temperature detector across a forehead and behind an ear, and selecting the maximum peak temperature of the two scans. This method insures that the most accurate temperature reading is taken. In situations where a forehead (temporal artery) measurement is low due to perspiration, behind the ear is a good alternative as there is typically little perspiration thereat. When the forehead has perspiration thereon, behind the ear is also a good choice for temperature measurement as the arteries are dilated providing an accurate measurement of the core temperature. The higher of the two temperature readings should indicate the most accurate core temperature reading. It should be noted that in the absence of perspiration, vasodilation may not be present, rendering the behind-the-ear site unreliable. Generally, vasodilation is the condition under which the neck and the area behind the ear exhibit the perfusion necessary for the measurement as well as the temporal artery area.

Preferably, electronics in the detector detect the maximum peak temperature of the two scans. Also, it is preferable that the operator continuously scan the detector from the forehead to behind the ear. A disposable cap, as described above, can cover the end of the temperature detector to prevent cross-contamination between persons.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
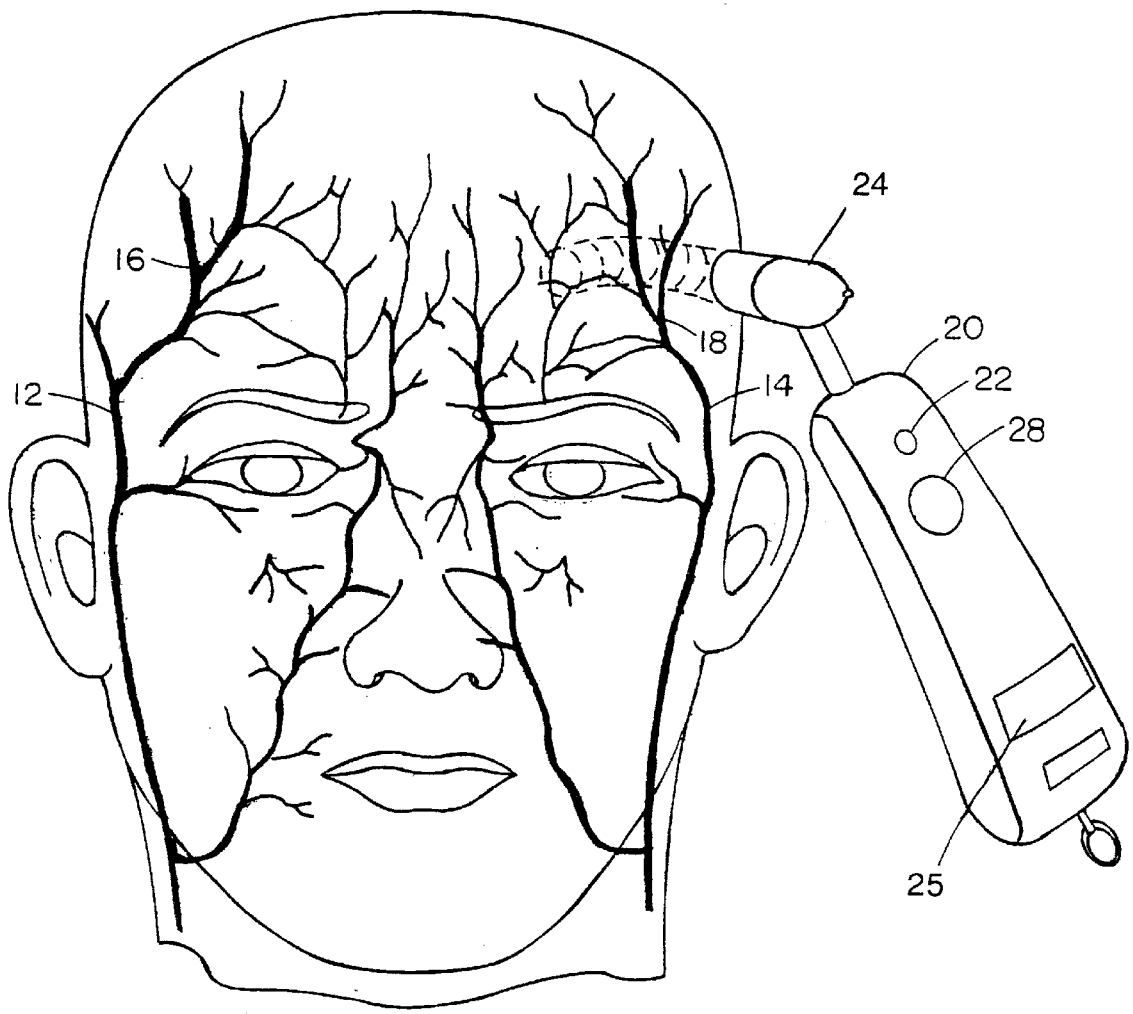
FIG. 1 illustrates an infrared thermometer scanning the temporal artery in the forehead in accordance with the present invention.

As illustrated in FIG. 1, the temporal arteries 12 and 14 extend upwardly toward the side of the human face and bifurcate at 16 and 18 in the forehead region. In that region, the temporal artery passes over the skull bone very close to the skin and is thus termed the superficial temporal artery. The superficial temporal artery is, therefore, particularly accessible for providing temperature readings and, as an artery, has a temperature close to the heart temperature. Further, there are no known arterial/venus anastomoses, that is, shunts between the artery and veins for regulation of skin temperature. Accordingly, the blood flow is relatively stable, varying very little compared to other areas of the skin.

To locate the temporal artery, a temperature sensor, preferably a radiation temperature detector 20, is scanned across the side of the forehead over the temporal artery while electronics in the detector search for the peak reading which indicates the temporal artery. Preferably, that temperature reading is then further processed in accordance with an algorithm specific to the temporal artery for providing a display temperature which may, for example, correspond to core, oral or rectal temperature.

The temperature detector 20 provides an audible beep with each peak reading. A display 25, such as a liquid crystal display or LED, provides the temperature reading resulting from the electronic processing discussed below, updated to each new peak reading. A button 28 enables the user to activate the temperature detector. In one embodiment, an LED 22 which flashes with each peak reading can be observed when someone other than the patient performs the reading, and another LED on the other side of the housing can be observed by the patient, particularly when taking his own temperature.

Figure 2A:
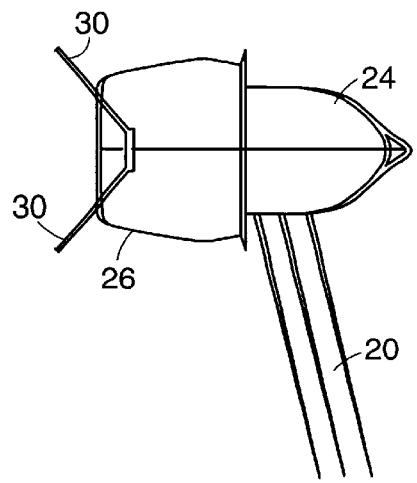
FIGS. 2A and 2B illustrate an infrared thermometer for clinical and home use, respectively, employing a disposable cap in accordance with the present invention.
Figure 2B:
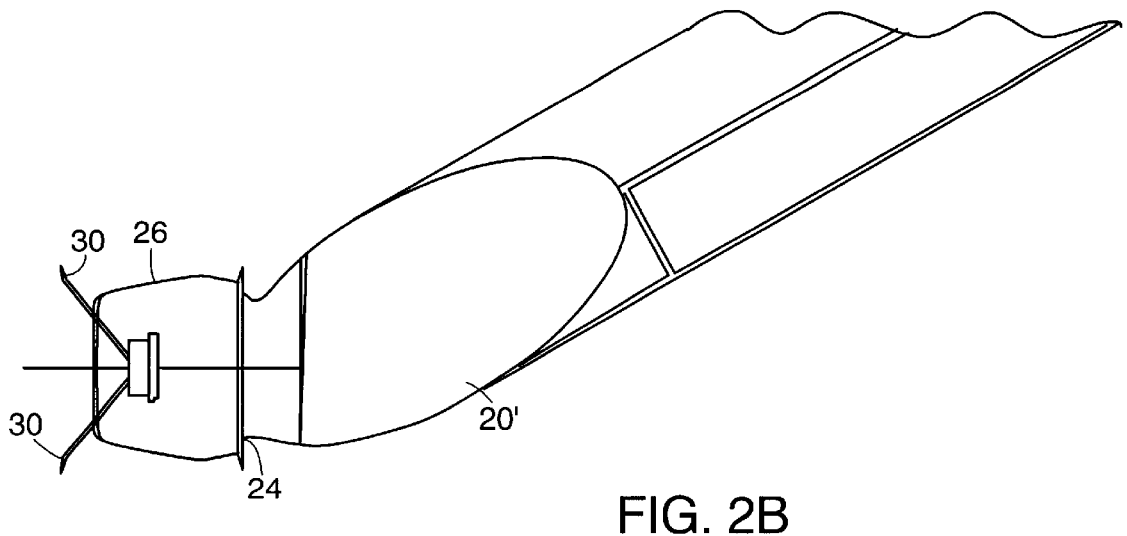

FIG. 2A illustrates a disposable cap 26, constructed according to the principles of the present invention, positioned over an end of temperature detector 20 to prevent cross-contamination between patients. More particularly, temperature detector 20, which is intended for clinical use, includes a radiation sensor housed within sensor assembly 24 as described in U.S. patent application Ser. No. 09/151,482. The radiation sensor has a field of view 30 which views and senses temperature readings from a target surface of a body, preferably the temporal artery. FIG. 2B illustrates disposable cap 26 positioned over an end of a temperature detector 20' intended for home use.

Figure 3:
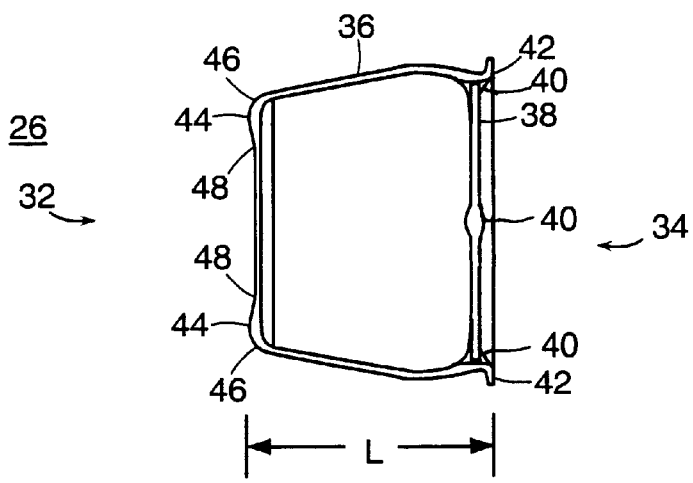
FIG. 3 is a longitudinal-sectional view of the disposable cap of FIGS. 2A and 2B.
Figure 4:
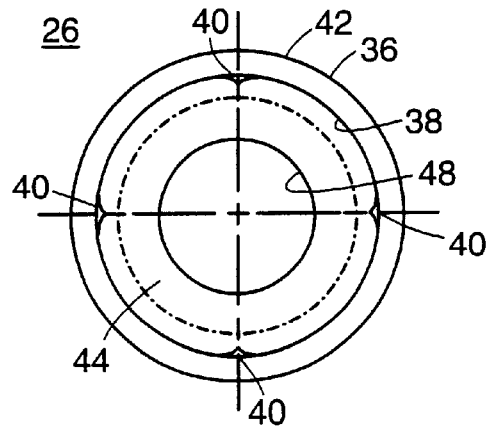
FIG. 4 is an end view of the disposable cap of FIG. 3.
Figure 5:
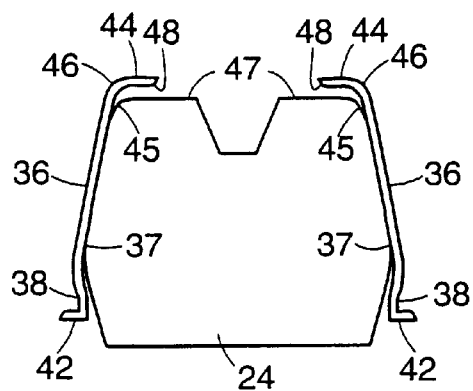
FIG. 5 is a partial longitudinal-sectional view of the disposable cap positioned on the infrared thermometer.

Cap 26, shown in a longitudinal-sectional view in FIG. 3, includes a viewing end 32 and a retaining end 34. FIG. 4 is an end view as viewed from the retaining end 34. FIG. 5 is a partial longitudinal-sectional view of the cap 26 positioned on the sensor assembly 24. With reference to FIGS. 3–5 the details of the cap 26 are described below.

Cap 26 includes a body 36 of a generally uniform material thickness. Preferably, the thickness of the body 36 is less than about 0.1 inch. More preferably, the body 36 has a thickness of less than about 0.05 inch. Most preferably, the body 36 has a thickness of about 0.020 inch.

Preferably, body 36 is thermoformed, or otherwise formed, from a single sheet of material. Although injection molding can be used in accordance with the present invention, thermoforming has been found to be the least expensive, especially for small production runs.

Retaining end 34 is substantially open such that it can slide over the arcuate shaped outside surface on the end of the temperature detector 20. For quick placement and release of the cap 26, it has been designed in one embodiment to snap-fit over the end of the detector 20. In one embodiment, an inwardly protruding ridge or protrusion 38 adjacent the retaining end 34 of the body 36 expands slightly as it passes over a wider portion 39 of the arcuate-shaped end of the detector 20 and contracts after the retaining end has passed over the wider portion to snugly secure the cap 26 on the detector.

The ridge 38 can include dimples 40 formed at select points around the circumference to facilitate expansion thereof. The dimples 40 also serve as cleats to provide additional retention force such that the cap 26 snugly fits on the sensor assembly 24. As specifically illustrated in FIG. 4, dimples 40 comprise inwardly protruding shaped projections which allow the ridge 38 to expand to pass over the wider portion 39 and contract after passing thereover. Preferably, dimples 40 divide the ridge 38 into four segments which can expand relative to each other.

An outwardly protruding annular lip 42 is provided on body 36 to allow an operator to easily remove the cap 26 from the detector 20. In one embodiment, the lip 42 is provided adjacent the retaining end 34.

The viewing end 32 of cap 26 includes a flange 44 having an aperture 48 completely therethrough so the cap 26 does not obstruct the field of view 30 of the radiation sensor in any manner. In a preferred embodiment, the aperture 48 has a diameter of between about 0.375 and 1 inches, and more preferably about 0.5 inch. In one embodiment, the outside diameter of the flange 44 adjacent the viewing end 32 is about 0.950 inch. In one embodiment, the overall length L can be at least about 0.810 inch to about 1 inch. In another embodiment, the length of the cap is at least about 0.375 inch, for use with infant temperature detection. In another embodiment, the length of the cap is at least about 0.75 inch, for use with adult temperature detection. Preferably, the cap 26 is sufficiently large so as to not be insertable into the ear of a human.

The flange 44 has an inside surface and an outside surface. The outside surface contacts the target surface, i.e., skin, of the body being measured. In a preferred embodiment, the flange 44 includes a radius of curvature 46 which can allow the outer periphery 45 of the inside surface of the flange to contact the terminal end 47 of the detector to provide an air gap between the terminal end of the detector and the flange. The flange 44 extends radially a distance substantially greater than its thickness and is spaced from the terminal end 47 of the detector 20 to provide the air gap. It is understood that there are other ways to provide a gap between the flange 44 and the terminal end 47 of the detector 20, such as providing a stop on the detector end which stops the retaining end 34 from fully sliding onto the end of the detector to provide the air gap at the viewing end 32.

This air gap provides at least two useful functions. First, the air gap acts as an insulator between the target surface and the end of the detector to minimize heating of the detector which induces inaccuracies into the resulting temperature reading. Second, the flange 44 is able to compress as it is moved across the target surface to reduce any uncomfortableness associated with pressing the detector 20 too hard against the target surface. That is to say, the end of cap 26 is compliant. In a preferred embodiment, the radius of curvature is about 0.1 inch, specifically about 0.093 inch.

Preferably, the flange 44 has at least about 0.2 square inches of surface area which contacts the body during temperature detection. More preferably, the flange 44 has at least about 0.4 square inches of surface area which contacts the body during temperature detection.

Preferably, the cap 26 is formed from polyethylene, polypropylene, polystyrene, or other suitable material which has desirable characteristics including low thermal conductivity and low hardness values. It is desirable to have a low thermal conductivity to prevent heat transfer from the target surface to the detector 20 which induces inaccuracies into the resulting temperature reading and so that the cap 26 does not feel cool to the patient. In one embodiment, the cap is formed from a material having a Rockwell hardness in the range of about 20 to 140 Shore D units and a thermal conductivity up to about $20.0 \times 10^{-4}$ cal./sec./sq.cm./1(° C./cm.). In another embodiment, the cap is formed from a material having a Rockwell hardness in the range of about 40 to 70 Shore D units and a thermal conductivity up to about $3.0 \times 10^{-4}$ cal./sec./sq.cm./1(° C./cm.). Because the outside surface of the flange 44 directly contacts the target surface, it is preferred that the material have a relatively low Rockwell hardness number so the cap does not feel "hard" and consequently uncomfortable to the patient.

The conductivity is preferably selected such that it does not cool the surface of the skin during temperature detection an unacceptable amount. In one embodiment, the cap 26 is positioned over the end of the detector and the detector is moved across the skin at the rate of about 1 inch/second. Preferably, the cap cools the surface of the skin by less than about 0.2° Fahrenheit during temperature detection to insure a reliable temperature reading.

Figure 6:
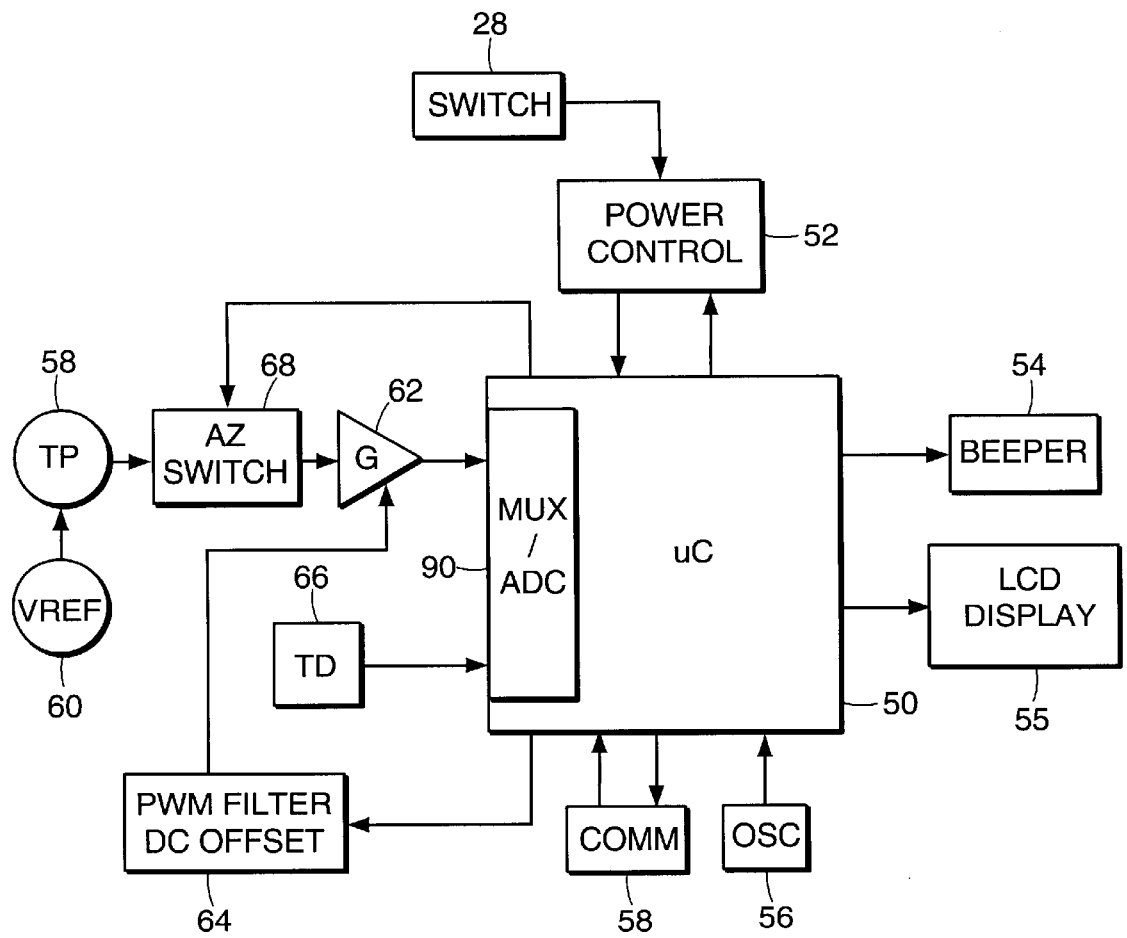
FIG. 6 is an electrical block diagram of the electronics of the thermometer of FIG. 1.

An electrical block diagram for the radiation detector is presented in FIG. 6. A microprocessor 50 is at the heart of the circuit. A power control circuit 52 responds to activation of the button switch 28 by the user to apply power to the microprocessor and other elements of the circuit. That power is maintained until the microprocessor completes the measurement cycle and signals the power control 52 to power down. The microprocessor is clocked by an oscillator circuit 56 and may communicate with an external source for programming and calibration through communication conductors 58. The temperature determined by the microprocessor is displayed on the liquid crystal display 25, and detection of peaks during the temperature processing is indicated by a beeper 54. Peaks are detected from readings taken at least three times per second, and preferably about ten times per second, for rapid scan across the forehead to avoid cooling of the forehead through the detector. During the measurement process, the microprocessor 50 takes readings through a multiplexer/analog-to-digital converter 56. The preferred microprocessor 50 is a PIC16C74 which includes an internal 8-bit A-D converter. To minimize expense, the circuit is designed to rely solely on that A-D converter.

Thermopile 58 provides a voltage output signal equal to the fourth power difference between target temperature and the temperature of the thermopile cold junction, offset by voltage reference 60. The voltage output from the thermopile is amplified by an amplifier 62, having a gain in the order of 1000, which also provides an offset determined by a pulse width modulated filter 64 controlled by the microprocessor 50. Through operation of the multiplexer, the microprocessor provides an analog-to-digital conversion of the amplified sensor output and of the detector temperature $T_d$ provided by temperature sensor 66. The temperature sensor 66 is positioned to sense the substantially uniform temperature of the thermopile cold junction, can and heat sink. An auto zero switch 68 is included to allow for isolation of the amplifier 62 from the thermopile 58 during a calibration sequence as discussed in prior U.S. application Ser. No. 08/738,300.

The operation of the present invention will now be described. The operator positions a disposable cap 26 on the end of temperature detector 20. The operator activates the detector 20 by pressing button 28. In a preferred embodiment, the operator scans the temperature detector 20 continually across the forehead of a patient while the electronics detect a peak temperature which is displayed in display 25.

In another embodiment, the operator scans the detector across the forehead of the patient and behind at least one ear. A maximum peak temperature of the two scans is selected. This insures that the most accurate, least invasive body temperature is measured. In situations where a forehead (temporal artery) measurement is low due to perspiration, behind the ear is a good alternative as there is typically little perspiration thereat. When the forehead does not have perspiration thereon, behind the ear is not a good choice for temperature measurement as the arteries may be constricted, thus providing an inaccurate measurement of the core temperature. The higher of the two temperature readings should indicate the most accurate core temperature reading.

In one embodiment, the operator scans across the forehead and obtains a first temperature measurement. The operator then scans behind one ear and obtains a second temperature measurement. The operator then selects the maximum temperature reading of the two scans. In another embodiment, electronics in the detector detect the maximum peak temperature of the two scans. Also, it is preferable that the operator continuously scan the detector from the forehead to behind the ear.

Figure 7:
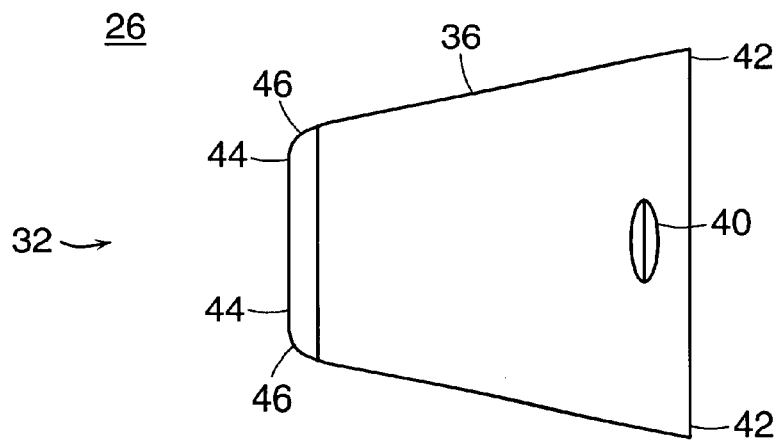
FIG. 7 is a longitudinal-sectional view of an alternative embodiment of a disposable cap in accordance with the present invention.
Figure 8:
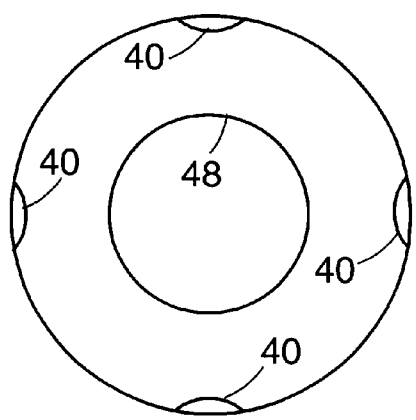
FIG. 8 is an end view of the disposable cap of FIG. 7.

FIGS. 7 and 8 illustrate another embodiment of a cap in accordance with principles of the present invention. In this embodiment, the walls of body member 36 are relatively straight, i.e., so as to form a conic shape. Inward projections or dimples 40 are configured to slide over the wider portion 39 of the arcuate-shaped end of the detector 20.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A body temperature detector comprising:
   a temperature detector including a radiation sensor which views a target surface of the body, the detector further including an end which is positioned adjacent the body during temperature detection; and
   a disposable cap covering substantially all of the end of the detector likely to contact the body to prevent cross-contamination between persons, the cap including an inwardly directed flange covering the end of the detector with an open aperture therethrough to permit the radiation sensor of the detector to view a target surface of the body, the flange extending radially a distance substantially greater than its thickness, the cap being spaced from the terminal end of the detector to provide an air gap between the terminal end of the detector and the flange.

2. The detector of claim 1, wherein the cap is formed from a sheet of material.

3. The detector of claim 1, wherein the end of the detector includes an arcuate shaped surface and wherein the cap includes at least one resilient expandable portion which allows the cap to expand to slide over a wider portion of the detector adjacent the end and contract to snugly fit on the arcuate shaped surface.

4. The detector of claim 3, wherein the expandable portion includes at least one dimple.

5. The detector of claim 1, wherein the cap snap-fits onto the detector.

6. The detector of claim 1, wherein the cap further includes an outwardly protruding annular lip to allow an operator to remove the cap from the detector.

7. The detector of claim 1, wherein the cap includes a generally uniform thickness of about 0.020 inch.

8. A method of detecting human body temperature, comprising:

provide a temperature detector, the detector including an end which is positioned adjacent the body during temperature detection;

covering, with a disposable cap, substantially all of the end of the detector likely to contact the body to prevent cross-contamination between persons, the cap including an inwardly directed flange covering the end of the detector with an open aperture therethrough to permit the radiation sensor of the detector to view a target surface of the body, the flange extending radially a distance substantially greater than its thickness; and moving the end of the detector across the skin of the body to detect the body temperature.

9. A body temperature detector comprising:

a temperature detector including a radiation sensor which views a target surface of the body, the detector further including an end which is positioned adjacent the body during temperature detection, the end including an arcuate shaped surface; and a disposable cap covering substantially all of the end of the detector likely to contact the body to prevent cross-contamination between persons, the cap including an inwardly directed flange covering the end of the detector with an open aperture therethrough to permit the radiation sensor of the detector to view a target surface of the body, the flange extending radially a distance substantially greater than its thickness and spaced from the terminal end of the detector to provide an air gap between the terminal end of the detector and the flange, the cap also including an inwardly protrusion including a dimple which allows the cap to expand to slide over a wider portion of the detector adjacent the end and contract to snugly and snap-fit on the arcuate shaped surface, the cap further including an outwardly protruding annular lip to allow an operator to remove the cap from the detector, the cap being formed from a single sheet of 0.020 inch material.

10. A method of detecting human body temperature, comprising:

providing a temperature detector, the detector including an end which is positioned adjacent the body during temperature detection;

covering, with a disposable cap, substantially all of the end of the detector likely to contact the body, the cap including an inwardly directed flange covering the end of the detector with an open aperture therethrough to permit the radiation sensor of the detector to view a target surface of the body, the flange aperture having a diameter of between about 0.375 and 1 inches; and moving the end of the detector across the skin of the body to detect the body temperature.

11. A method of detecting human body temperature, comprising:

providing a temperature detector, the detector including an end which is positioned adjacent the body during temperature detection;

covering, with a disposable cap, substantially all of the end of the detector likely to contact the body to prevent cross-contamination between persons, the cap including an inwardly directed flange covering the end of the detector with an open aperture therethrough to permit the radiation sensor of the detector to view a target surface of the body, the flange having at least about 0.2 square inches of surface area which contacts the body during temperature detection; and moving the end of the detector across the skin of the body to detect the body temperature.

12. A body temperature detector comprising:

a temperature detector including a radiation sensor which views a target surface of the body, the detector further including an end which is positioned adjacent the body during temperature detection; and a disposable cap covering substantially all of the end of the detector likely to contact the body to prevent cross-contamination between persons, the cap contacting the surface of the skin and being moved at the rate of about 1 inch/second, wherein the cap cools the surface of the skin by less than about 0.2° Fahrenheit.

13. The detector of claim 12, wherein the cap includes an inwardly directed flange covering the end of the detector, the flange including an aperture therethrough to permit the radiation sensor of the detector to view a target surface of the body, the flange extending radially a distance substantially greater than its thickness.

14. A method of detecting human body temperature, comprising:

providing a temperature detector, the detector including an end which is positioned adjacent the body during temperature detection, the end comprising metal;

covering, with a disposable cap, substantially all of the end of the detector likely to contact the body; and moving the end of the detector across the skin of the body to detect the body temperature, the detector being moved at the rate of about 1 inch/second, wherein the cap cools the surface of the skin by less than about 0.2° Fahrenheit.

15. A method of detecting human body temperature comprising:

scanning a temperature detector across a forehead and scanning the temperature detector behind an ear; and selecting the maximum peak temperature of the two scans.

16. The method of claim 15, further comprising the step of continuously scanning from the forehead to behind the ear.

17. The method of claim 15, further comprising the step of detecting, with electronics in the detector, the maximum peak temperature of the two scans.

18. The method of claim 15, further comprising the step of covering the temperature detector with a disposable cap to prevent cross-contamination between persons, the cap covering substantially all of the outside surface likely to contact the body to prevent cross-contamination between persons.

19. The method of claim 18, further comprising the steps of:

scanning the forehead and behind the ear with a radiation sensor which views a target surface of the body; and providing an aperture in the cap to permit the radiation sensor to view the target surface.

20. The method of claim 18, further comprising the step of providing an air gap between a terminal end of the detector and the cap.

21. The method of claim 18, further comprising the step of sliding the cap over an end of the temperature detector, wherein an end of cap expands to slide over an arcuate shaped outside surface of the detector.

* * * * *